(12) United States Patent  
Damian

(10) Patent No.: US 6,886,876 B1
(45) Date of Patent: May 3, 2005

(54) VEHICLE STORAGE BOX ASSEMBLY

(75) Inventor: Gerald M. Damian, Elmwood Park, IL (US)

(73) Assignee: Damian Productions, Inc., Elmwood Park, IL (US)

( * ) Notice: Subject to any disclaimer, the term of this patent is extended or adjusted under 35 U.S.C. 154(b) by 0 days.

(21) Appl. No.: 10/841,161

(22) Filed: May 7, 2004

(51) Int. Cl.[7] ............................................... B60R 9/00
(52) U.S. Cl. .................................... 296/37.6; 224/404
(58) Field of Search ............................ 296/37.6, 39.2; 224/403, 404, 405

(56) References Cited

U.S. PATENT DOCUMENTS

| | | |
|---|---|---|
| D294,935 S | 3/1988 | Grossman |
| 4,770,330 A | 9/1988 | Bonstead et al. |
| 4,991,899 A | 2/1991 | Scott |
| 5,494,315 A * | 2/1996 | Heltenburg ................ 296/37.6 |
| 5,848,818 A | 12/1998 | Flueckinger |
| 5,893,599 A | 4/1999 | Strohfeldt |
| D411,164 S | 6/1999 | Harris |
| 5,944,372 A | 8/1999 | Gilbert |
| 5,947,356 A | 9/1999 | Delong |
| 6,003,923 A | 12/1999 | Scott et al. |
| 6,139,080 A | 10/2000 | Saffold |
| 6,234,559 B1 * | 5/2001 | Block et al. ................ 396/37.6 |
| 6,481,604 B1 * | 11/2002 | Beene et al. ................ 396/37.6 |
| 6,523,877 B1 | 2/2003 | Damian |

* cited by examiner

Primary Examiner—Jason Morrow
(74) Attorney, Agent, or Firm—Cook, Alex, McFarron, Manzo, Cummings & Mehler, Ltd.

(57) ABSTRACT

A vehicle storage box assembly for securely and rapidly installing in and/or removing a storage box from the bed of a vehicle without having to drill holes in the vehicle and/or providing a large inventory of such boxes to accommodate different pickup bed configurations. The vehicle storage box assembly includes a box having ribs on the bottom which are transversely and laterally adjustable to be complimentary to grooves in the vehicle bed. The storage box further includes a plurality of jam blocks which are moved into and out of position with a channel on the vehicle by a quick acting line toggle clamp mounted to a wall on the interior of the storage box.

16 Claims, 2 Drawing Sheets

VEHICLE STORAGE BOX ASSEMBLY

BACKGROUND AND SUMMARY OF THE INVENTION

The present invention relates to a vehicle storage box assembly for securely attaching to a pickup truck bed.

The use of vehicle storage boxes is known in the art. One such vehicle storage box assembly is described in my prior U.S. Pat. No. 6,523,877 in which the storage box may be securely attached to a pickup truck bed without having to drill holes or weld or otherwise fix various fasteners to or in the truck pickup bed or walls thereof.

Although the assembly shown in my prior patent is capable of relatively easy installation in or removal from the truck bed, it would be desirable if the ease and/or speed of installation or removal could be further improved. Moreover, it also would be advantageous if a single assembly would be capable of being readily adapted to the configuration of various pickup beds of different manufacturers or models without the need to provide an inventory of different assembly configurations for different variously configured truck beds.

The improved vehicle storage box assembly of the present invention achieves those goals. The assembly of the present invention may be easily and rapidly installed in and/or removed from the pickup bed of a truck. Moreover, the vehicle storage box assembly of the present invention may be readily adjusted and adapted to accommodate a wide variety of pickup bed configurations and truck models without the need to maintain an inventory of differing assemblies for specific pickup bed configurations and/or truck models.

In one principal aspect of the present invention, a storage box is provided for installation in a vehicle having a bed that includes a sidewall and a grooved floor, and the sidewall has a channel facing the grooved floor. The storage box comprises a main portion having an interior and a bottom surface; a rib extending along the bottom surface; and a mounting for mounting the rib to the bottom surface so that it is laterally adjustable so that the rib may be movably positioned to be complimentary to the grooved floor for preventing lateral movement of the main portion relative to the grooved floor. An elongate rod is extendably coupled to the main portion, the rod being positioned such that it moveably extends toward the channel in the sidewall when the main portion is positioned adjacent the sidewall to prevent the rib from disengaging the grooved floor whereby the main portion is secured to the bed of the vehicle.

In another principal aspect of the present invention, the mounting comprises at least one laterally extending slot in the bottom surface, and a fastener which is coupled to the rib and extends through the slot. The fastener has a first loosened condition in which the fastener is movable in the slot to permit lateral movement of the rib relative to the bottom surface, and a second tightened condition in which the rib is fixed relative to the bottom surface.

In still another principal aspect of the present invention, the storage box includes a plurality of the ribs laterally spaced from each other.

In still another principal aspect of the present invention, the storage box includes an aperture in the main portion, and the rod extends from the interior of the main portion through the aperture.

In still another principal aspect of the present invention, the storage box includes a quick acting line clamp in the interior of the main portion, the line clamp including the rod.

The quick acting line clamp is movable to a first position in which the rod moves outwardly of the interior through the aperture and toward the channel, and to a second position in which the rod moves inwardly of the interior through the aperture and away from the channel.

In still another principal aspect of the present invention, the storage box includes a jam block, and the rod contacts the jam block to move the jam block into the channel when the rod is moved toward the channel, and away from the channel when the rod is moved away from the channel.

In still another principal aspect of the present invention, the line clamp is mounted to a wall in the interior of the main portion.

In still another principal aspect of the present invention, the rod is threaded and a locking nut is threadedly coupled to a portion of the threaded rod, and the locking nut is positionable relative to the main portion for locking the threaded rod in an extended position.

These and other objects, features and advantages of the present invention will be more clearly understood through a consideration of the following detailed description.

BRIEF DESCRIPTION OF THE DRAWINGS

In the course of this description reference will frequently be made to the attached drawings in which.

DESCRIPTION OF THE PREFERRED EMBODIMENT

Figure 1:
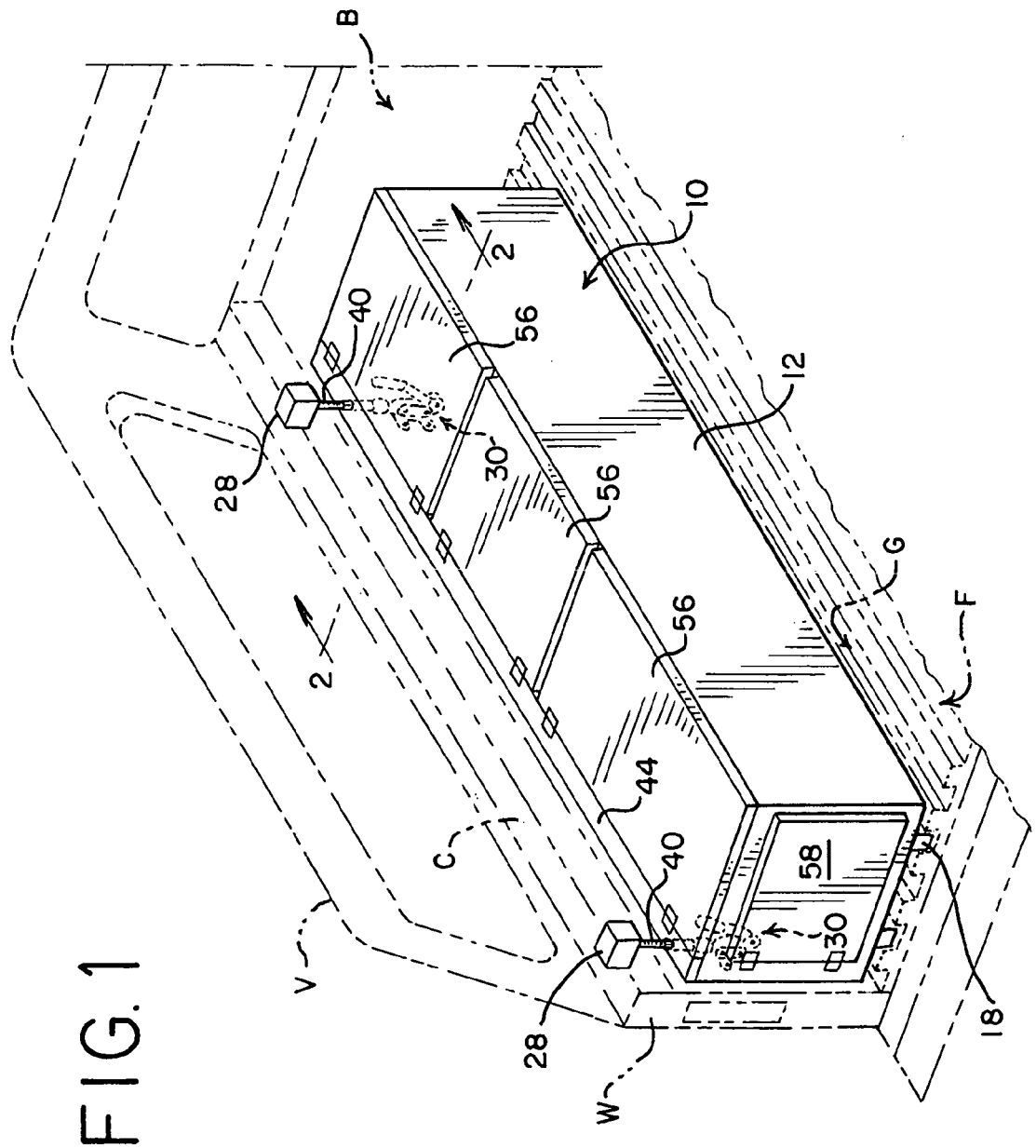
FIG. 1 is a perspective view of a preferred embodiment of vehicle storage box assembly constructed in accordance with the principles of the present invention.

A preferred embodiment of vehicle storage box assembly incorporating the principles of the present invention is shown in the drawings. The vehicle storage box assembly includes a storage box 10 which is designed to be mounted and attached to the bed B of a vehicle V, such as a pickup truck, and which bed has a side wall W and a floor F with grooves G. The side wall W has a channel C facing the grooved floor F all as best seen in FIGS. 1 and 2.

Figure 2:
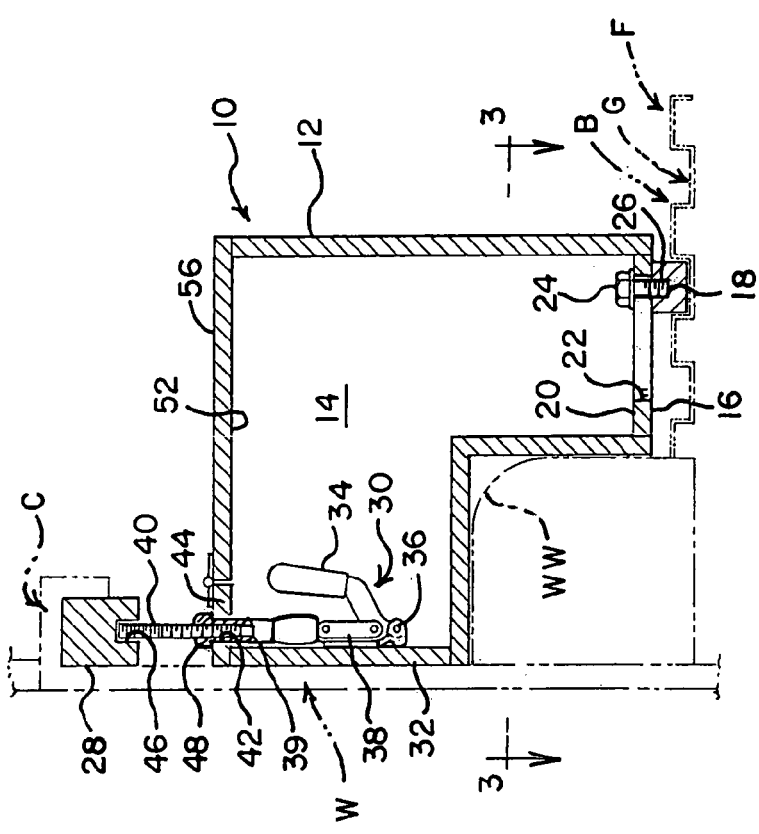
FIG. 2 is a cross-sectioned end elevation view of the assembly as viewed substantially along line 2—2 of FIG. 1.
Figure 3:
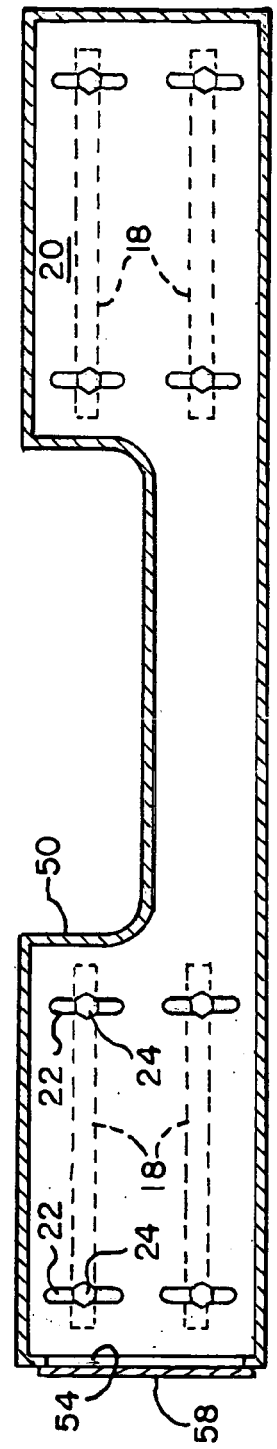
FIG. 3 is a top plan view of the interior bottom of the storage box as viewed substantially along line 3—3 of FIG. 2.

The storage box 10 generally comprises a main portion 12 having an interior 14 and a bottom surface 16 as best seen in FIG. 2. A plurality of ribs 18 are positioned at the bottom surface 16. The main portion 12 of the box also includes a floor 20 having a plurality of spaced transversely extending slots 22 extending therethrough from the interior 14 to the bottom surface 16, as best seen in FIGS. 2 and 3. A fastener, such as a threaded bolt 24, extends through each slot 22 and into a complimentary threaded opening 26 in the ribs 18. Accordingly, the bolt 24 may be loosened to permit the ribs 18 to be adjusted laterally and transversely across the bottom surface 16 of the floor 20 to permit adjustment of the ribs to conform with differently spaced grooves G in differing configurations of truck beds. Once the respective ribs 18 are adjusted to their desired positions, the bolts 24 may again be tightened to lock the ribs in their desired position.

A plurality of jam blocks 28 are also provided along the length of the storage box. The jam blocks 28 each are positioned on the main portion 12 so that they can extend into the channel C in the side wall W as best seen in FIG. 2.

Thus, when the jam blocks 28 are individually firmly positioned in the channel C, the ribs 18 are prevented from disengaging the grooves G in the floor F, so that the main portion of the vehicle storage box 10 is secured to the bed B of the vehicle V.

In the preferred embodiment of the assembly of the invention, several quick acting straight line toggle clamps 30 are mounted to the inner surface of the back wall 32 in the interior 14 of the storage box 10, as best seen in FIGS. 1 and 2, and in spaced relationship to each other. Each toggle clamp 30 comprises a quick acting handle 34 which is mounted to the base of the clamp at a pivoital mounting 36, and a link 38 is coupled at one end to the handle 34 and at the other end to an internally threaded sleeve 39. A rod 40 is threaded into the other end of the sleeve 39 and extends through an aperture 42 in the top 44 of the storage box 10 and upwardly into a recess 46 in the jam block 28, as best seen in FIG. 2. The rod 40 may be treaded into and out of the sleeve 39 to adjust the overall length of the sleeve and rod assembly.

The total length of the sleeve 39 and rod 40 is adjusted so that when the handle 34 is in the position shown in FIG. 2, the rod 40 will firmly press the jam block 28 into the channel C. However, when the handle is rotated in a clockwise direction as viewed in FIG. 2, the rod 40 will move toward the interior 14 of the storage box 10 to lower and release the jam block 28 from the channel C to enable easy removal of the storage box 10 from the bed B of the vehicle V.

A locking nut 48 may also be threaded onto the threaded rod 40 and against the top 44 of the storage box to lock the straight line toggle clamp 30 in its extended position, as shown in FIG. 2.

In one embodiment the main portion 12 of the storage box 10 may include an indented portion 50 as best seen in FIG. 3 which is positioned to receive a wheel well WW of the vehicle V extending into the bed B.

The main portion 12 of the storage box 10 also preferably includes a top opening 52 and an end opening 54. One or more of top doors 56 or end doors 58 are hingedly coupled to the main portion for selectively covering the top opening 52 and end opening 54, respectively. Alternatively, the top opening 52 may be divided into multiple openings and the interior space of the main portion may be divided into separate chambers using interior walls not shown.

Although it is believed that one skilled in the art will fully understand the steps to be taken to install and/or remove the vehicle storage box 10 in the bed B of the vehicle V after considering the above description, a brief description thereof follows.

Initially, the vehicle storage box 10 is positioned in the vehicle bed B as seen in FIG. 2 with the back wall 32 of the storage box against the wall W of the bed B. The ribs 18 are then transversely adjusted by movement of the bolts 24 in the slots 22 until each of the ribs is positioned in a groove G on the floor F, as seen in FIG. 2. Because the ribs 18 are adjustable, they can be easily and rapidly adjusted to accommodate varying groove configurations in different vehicle models and configurations without the need to stock several varieties of storage boxes with ribs to accommodate specific configurations.

Once the ribs 18 are properly adjusted in the desired position in the appropriate grooves G, the threaded bolts 24 are tightened from the interior of the box 10 locking the ribs in position.

Until this time the handle 34 of the straight line toggle clamp 30 has been lowered to a position clockwise from the position shown in FIG. 2. In this position the rod 40 has been retracted away from the channel C and toward the interior 14 of the main portion 12 through the aperture 42 and the jam block 28 has been withdrawn from the channel C.

With a jam block 28 positioned on each of the rods 40, the handle 34 of the straight line toggle clamp 30 is then rotated in a counterclockwise direction to the position as shown in FIG. 2. This will extend the rod 40 through the aperture 42 to move the jam block 28 toward and into the channel C. If the jam block 28 is not sufficiently tightly jammed into the channel C, the threaded rod 40 may be manually threaded further out of the sleeve 39 until the jam block 28 is sufficiently secured in the channel C when the handle 34 of the straight line toggle clamp 30 is in the position shown in FIG. 2. At this point the ribs 18 will become locked into grooves G to preclude lateral movement of the box in the bed B of the vehicle V.

Once the vehicle storage box 10 has been secured in the bed B, the locking nut 48, if provided, can be threaded until it is in contact with the top 44 of the vehicle storage box 10 to lock the rod 40 against further accidental longitudinal movement. Although the locking nut 48 is shown, it may be eliminated if desired which will speed the installation or removal procedure.

If it is desired to remove the vehicle storage box 10 from the bed B, all that need be done is to rotate the handle 34 of the straight line toggle clamps 30 in a clockwise direction as viewed in FIG. 2. This movement will draw the sleeve 39 and rod 40 downwardly in the aperture 42 and toward the interior 14 of the main portion 12, and release the jam block 28 from the channel C.

When considering the foregoing description, it will be appreciated that the vehicle storage box assembly of the present invention may be readily and rapidly adapted to be adjusted to accommadate a wide range of groove configurations in different vehicles V without the need to inventory a large number of vehicle storage boxes which are designed to accommodate only certain vehicle models and/or configurations. It will also be appreciated that the installation and removal of the vehicle storage boxes of the present invention may be accomplished easily and rapidly, and without the need for specially designed tools.

It will also be understood that the preferred embodiment of the present invention which has been described is merely illustrative of the principles of the present invention. Numerous modifications may be made by those skilled in the art without departure from the true spirit and scope of the invention.

I claim:

1. A storage box for a vehicle having a bed that includes a sidewall and a grooved floor, the sidewall having a channel facing the grooved floor, said storage box comprising:
   a main portion having an interior and a bottom surface;
   a rib extending along said bottom surface;
   a mounting for mounting said rib to said bottom surface so that it is laterally adjustable so that said rib may be movably positioned to be complimentary to the grooved floor for preventing lateral movement of said main portion relative to the grooved floor; and
   an elongate rod extendably coupled to said main portion, said rod being positioned such that it moveably extends toward the channel in the sidewall when the main portion is positioned adjacent the sidewall to prevent said rib from disengaging the grooved floor whereby said main portion is secured to the bed of the vehicle.

2. The storage box of claim 1, wherein said mounting comprises at least one laterally extending slot in said bottom surface, and a fastener which is coupled to said rib and extends through said slot, said fastener having a first loosened condition in which said fastener is movable in said slot to permit lateral movement of said rib relative to said bottom surface, and a second tightened condition in which said rib is fixed relative to said bottom surface.

3. The storage box of claim 2, including a plurality of said ribs laterally spaced from each other.

4. The storage box of claim 1, wherein said mounting comprises at least one laterally extending slot in said bottom surface, and a fastener which is coupled to said rib and extends through said slot, said fastener having a first loosened condition in which said fastener is movable in said slot to permit lateral movement of said rib relative to said bottom surface, and a second tightened condition in which said rib is fixed relative to said bottom surface.

5. The storage box of claim 1, including an aperture in said main portion, said rod extending from said interior of said main portion through said aperture.

6. The storage box of claim 5, including a quick acting line clamp in the interior of said main portion, said line clamp including said rod, said quick acting line clamp being movable to a first position in which said rod moves outwardly of said interior through said aperture and toward the channel, and to a second position in which said rod moves inwardly of said interior through said aperture and away from the channel.

7. The storage box of claim 6, including a jam block, said rod contacting said jam block to move said jam block into the channel when said rod is moved toward the channel, and away from the channel when said rod is moved away from the channel.

8. The storage box of claim 6, wherein said line clamp is mounted to a wall in the interior of said main portion.

9. The storage box of claim 1, including a jam block, said rod contacting said jam block to move said jam block into the channel when said rod is moved toward the channel, and away from the channel when said rod is moved away from the channel.

10. The storage box of claim 1, wherein said rod is threaded; and a locking nut threadedly coupled to a portion of said threaded rod, said locking nut being positionable relative to said main portion for locking said threaded rod in an extended position.

11. The storage box of claim 1, including an aperture in said main portion, said rod extending from said interior of said main portion through said aperture;

a quick acting line clamp mounted to a wall in the interior of said main portion and including said rod, said quick acting line clamp being moveable to a first position in which said rod moves outwardly of said interior through said aperture and toward the channel, and to a second position in which said rod moves inwardly of said interior through said aperture and away from the channel; and a jam block, said rod contacting said jam block to move said jam block into the channel when said rod is moved toward the channel and away from the channel when said rod is moved away from the channel.

12. A storage box for a vehicle having a bed that includes a sidewall and a grooved floor, the sidewall having a channel facing the grooved floor, said storage box comprising:

a main portion having an interior and a bottom surface;

a rib extending along said bottom surface whereby said bottom surface is adapted to be complimentary to the grooved floor for preventing lateral movement of said main portion relative to the grooved floor;

an elongate rod extending from said main portion, said rod being positioned such that it movably extends toward the channel in the sidewall when the main portion is positioned adjacent the sidewall to prevent said rib from disengaging the grooved floor whereby said main portion is secured to the bed portion of the vehicle;

an aperture in said main portion, said rod extending from said interior of said main portion through said aperture; and a quick acting line clamp in the interior of said main portion, said line clamp including said rod, said quick acting line clamp being movable to a first position in which said rod moves outwardly of said interior through said aperture and toward the channel, and to a second position in which said rod moves inwardly of said interior through said aperture and away from the channel.

13. The storage box of claim 12, wherein said line clamp is mounted to a wall in the interior of said main portion.

14. The storage box of claim 12, including a jam block, said rod contacting said jam block to move said jam block into the channel when said rod is moved toward the channel and away from the channel when said rod is moved away from the channel.

15. The storage box of claim 14, wherein said rod is threaded; and a locking nut threadedly coupled to a portion of said threaded rod, said locking nut being positionable relative to said main portion for locking said threaded rod in an extended position.

16. The storage box of claim 12, wherein said rod is threaded; and a locking nut threadedly coupled to a portion of said threaded rod, said locking nut being positionable relative to said main portion for locking said threaded rod in an extended position.

* * * * *